UNITED STATES PATENT OFFICE.

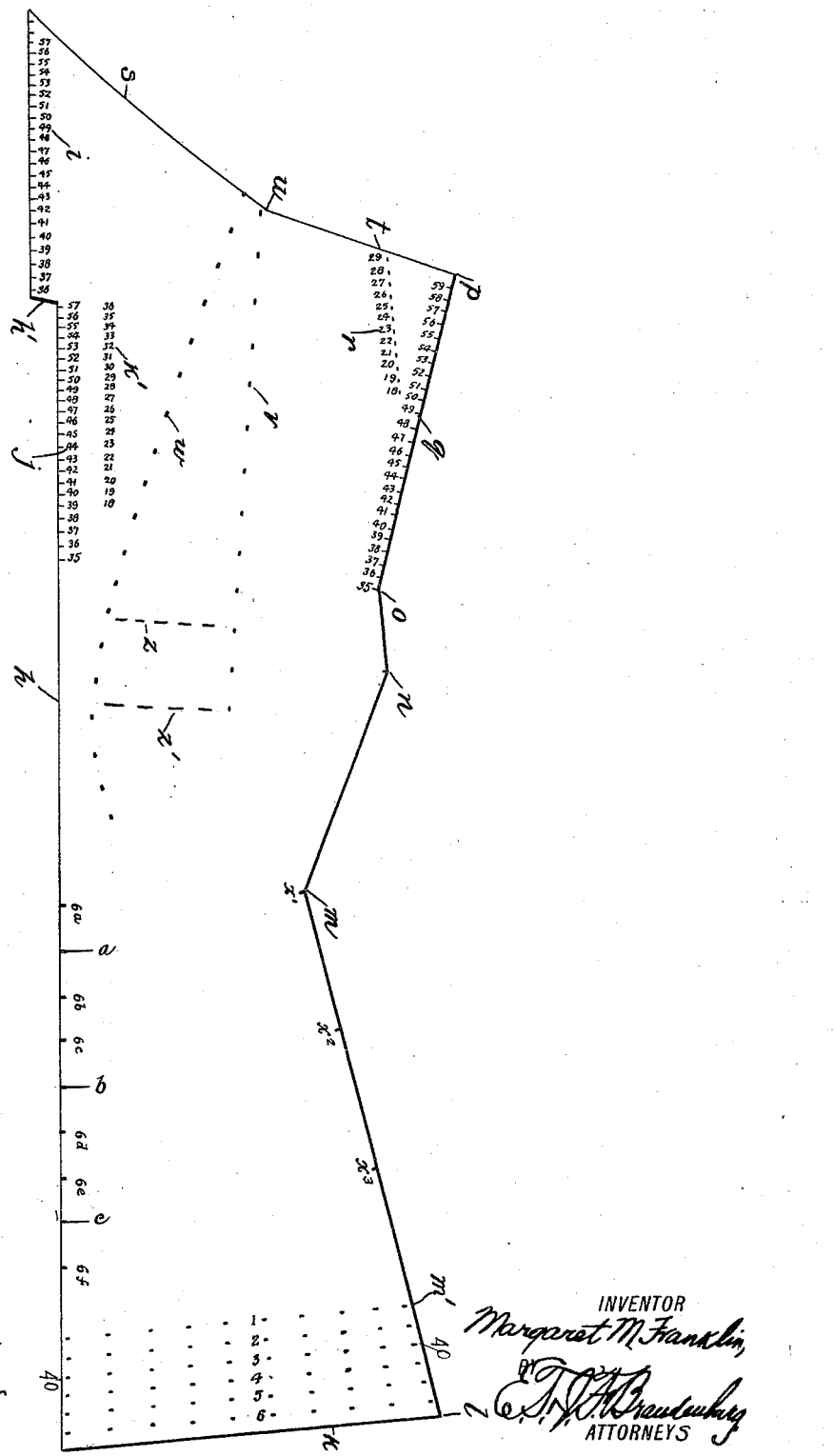

MARGARET M. FRANKLIN, OF CHICAGO, ILLINOIS.

CORSET AND SWIMMING-BELT CHART.

1,005,951.

Specification of Letters Patent. Patented Oct. 17, 1911.

Application filed December 17, 1909. Serial No. 533,607.

*To all whom it may concern:*

Be it known that I, MARGARET M. FRANKLIN, a citizen of the United States, residing at Chicago, in the county of Cook and State of Illinois, have invented new and useful Improvements in Corset and Swimming-Belt Charts, of which the following is a specification.

My invention has for its object the production of a chart designed to be used in outlining patterns for such garments as a corset, abdominal belt, or the like, by the use of which patterns for garments of widely different measurements may be outlined.

A further object of my invention is to provide a chart formed of a single piece of material for cutting patterns for garments requiring a plurality of different sized and shaped pieces in the formation of the garment, but all of which may be outlined by proper measurements and indications taken from this single piece chart.

Another object of my invention is to provide a chart of this kind which shall be extremely simple in its construction and in the method of its use, yet from which the pattern for a perfect garment may be formed, a garment perfect not only from an anatomical standpoint but which shall be perfect also from an artistic and esthetic standpoint as well.

A further object of my invention is to produce a chart for designing patterns for garments which shall be very precise in their exactness, one in which there is a line or mark, or indication for every outline or contour to be formed in the entire garment, each line or dot or other indicating mark upon the chart having a relative bearing to every other line or indicating mark, and by following the same according to instructions given with the chart will produce a pattern for a garment having any set of measurements required to fit the individual on whom the measurements were taken.

In the drawings, the figure represents a plan view of my chart showing every indication necessary for the delineation of an entire garment.

This chart may be made of aluminum, cardboard, or any other suitable material capable of retaining a flat shape and of receiving and retaining the indicating marks thereon which are necessary for securing the proper measurements.

The contour of the chart is plainly indicated in the drawing, being of greater width than length, and having outline lines inclined at varying degrees for purposes hereinafter explained.

The front edge K of this chart represents a straight vertical line which forms the straight middle front of the garment.

Extending parallel with the line K are a plurality of dotted lines, 1, 2, 3, 4, 5, 6 which are designed to represent the front vertical line for garments of different bust measurements. Thus, if bust measure required is 36 inches or less dotted line 1 will form the front or K edge of the pattern. If bust measurement is 37, 38 or 39 inches dotted line 2 will form the front or K edge of the pattern. The distance between each of these rows of dotted lines allows for an additional three inches in bust measurement each time.

The points indicated at $x'$, $x^2$, $x^3$ are the upper points of termination of the three bust darts necessary in the garment to fit the outline according to the measurement. From the top of the vertical line K to the top of the dart $x'$ an inclined line $l$—$m$ is formed on the chart for the purpose of showing the exact incline of the shape of the corset at this point.

The bottom of this chart indicated by the line $h$ represents the smallest circumferential line in the garment. In the edge $h$ of the chart are a plurality of notches $6^a$, $6^b$, $6^c$, $6^d$, $6^e$, $6^f$, which indicate the width of each dart at the waist line, the dart terminating at the top at $x'$ expanding to notches $6^a$—$6^b$, at the waist line; the dart terminating at the top at $x^2$ expanding to notches $6^c$—$6^d$ at the waist line; the dart terminating at the top at $x^3$ expanding to notches $6^e$—$6^f$ at the waist-line.

Lines $a$, $b$, and $c$ indicate the direction of these three darts $x'$, $x^2$, $x^3$, below the waist line to the lower edge of the garment, and in outlining the pattern the measure used by the operator is extended downwardly parallel with each of the lines $a$, $b$, $c$, to any distance required for the length of the garment.

Along the upper edge, $q$, of the chart is an inclined row of indicating marks arranged on a scale and numbered consecutively from 35 to 59 inclusive, each of which said numbers corresponds to the number of inches in different sized bust measurements and governs the size of the front of the corset at the upper edge thereof, and the incline of this line governs the incline of the top of the garment at this point.

A plurality of indicating marks numbering from 36 to 57 on the drawing (the numbers 36 to 57 corresponding to the number of inches in different sizes of bust measurements) at $i$, and a corresponding number of indicating marks numbered consecutively from 35 to 57 at $j$ govern the size of the back of the corset at the upper edge thereof, and are used in outlining the pattern as hereinafter described. Line $h'$ connecting these two lines of numbers indicates difference in height of back of corset at these two points.

Extending parallel with the line of numbers $j$ is another line or row of numbers $K'$ ranging from 18 to 36 consecutively, which numbers correspond to the number of inches in the waist measure, and which govern the size of the front of the corset at the waist line according to the waist measurement.

$r$ is a line of perforations in the chart, having opposite each perforation a number, ranging from 18 to 29 consecutively, and governs the size of the back of the corset at the waist line according to waist measurement.

$v$ is a straight line of perforations extending through one half of the chart, which line of perforations represents the center of the side dart in the garment, and below the same is a curved line of perforations $w$, which represents the curve given to this dart as hereafter explained.

The upper edge of the chart along the inclined line from P to $o$, and from $o$ to $n$ indicates the shape of the front edge of the side back of the garment, the line $t$—$u$—$s$ forming the shape of the back hip line of the back of the garment.

I have now described every line, notch number and perforation shown upon the chart and from this will now explain how my chart is utilized to outline a pattern for a garment of the class described.

First, the person for whom the garment is to be made is measured, and for the purpose of this description the following measurements will be assumed: bust 40 inches; waist 26 inches; hip 42 inches and back 14 inches. In drafting a pattern a sheet of paper about 20 by 30 inches in size should be used. Place the chart upon the paper with the edge K parallel with the straight edge of the paper. The bust measurement in this instance being 40, a line is indicated upon the paper extending from line 3 and marked 40—40. Indicating marks are placed upon the paper corresponding with points on the top of the chart marked $x'$, $x^2$, $x^3$, and on the bottom of the chart at $6^a$, $6^b$, $6^c$, $6^d$, $6^e$, $6^f$. In the row of figures along the inclined edge $q$ of the chart place an indicating mark opposite the number corresponding with the bust measurement 40, also a corresponding mark —26 extending from the waist measurement row of figures $K'$. Place a ruler upon the chart parallel with the line $a$ and extend downwardly on the pattern about ten inches (this ten inches being the same on all garments of this kind). Repeat this with lines $b$ and $c$. The chart is then removed from the paper and the ruler used as follows: Place the ruler parallel with line 40—40 and with a pencil draw a line extending from the top of the chart downwardly to a point representing the bottom of the corset which will be found as hereinafter explained. The line just drawn represents the front of the garment. From the top of line 40—40 draw a line to meet the number 40 on line $q$, which is the number indicating bust measure. Place the ruler at 40 on line $q$ and on 26 (waist measure) at line $K'$ and draw a line on the pattern downwardly from 40 on line $q$ to 26 on line $K'$, the length of this line is governed by the length of the back measure; thus, if the back measure is 14 inches or less the length of this line will be 6 inches. If the back measure is $14\frac{1}{2}$ inches the length of this line will be $6\frac{1}{2}$ inches, an additional one half inch being added to the length of this line for each one half inch increase in back measure. In this instance the length of the back being 14 inches the line from 40—$q$ to 26—$K'$ will be 6 inches. From a point at the bottom of this 6 inches draw a line forward through $6^f$ to clasp line or line 40—40 at the front of the pattern. This line forms the inclined waist line.

To form the hip line of the garment place the chart with the point $u$ at the junction of the 6 inch line with the waist line on the pattern having line P—$u$ on the chart exactly parallel with the front edge of the paper which will bring the line P—$u$ exactly at right angles with the top edge of the paper. With the chart thus placed draw a line on the pattern from $u$ down line $s$ extending this line anywhere from 8 to 16 inches according to the length desired for a shorter or longer garment. From the lower end of the last mentioned line draw a line on the pattern to the lower end of clasp line or line 40—40 at the front of the pattern. This line forms the lower edge of the pattern. Extend lines $a$, $b$, $c$ to the bottom of the pattern. Draw a line from $x^3$ to $6^f$ and extend downwardly to the point where line 40—40 joins the bottom of the pattern. Draw another line from $x^3$ to $6^e$ at the waist line and extend downwardly to a point midway between $c$ and $b$ at the bottom of the pattern. These two lines drawn from $x^3$ to the bottom of the pattern form the front dart of corset. Draw a line from $x^2$ to $6^d$ at waistline and extend downwardly to a point midway between $c$ to $b$ line at the bottom of the pattern. Draw another line from $x^2$ to $6^c$ at the waist line and extend downwardly to a point midway between $b$ and $a$. These two lines drawn down from $x^2$ to the bottom of pattern form the second dart in the front of the garment. Draw a line from $x'$ to $6^b$ at the waist line and extend downwardly to a point midway between $b$ and $a$ at the bottom of the pattern. Draw another lint from $x'$ to $6^a$ at the waist line and extend downwardly to a point $2\frac{1}{4}$ inches to the left of $a$ at the bottom of the pattern. These two lines form the third dart in the front of the garment.

To outline the side dart of the garment place the chart on the pattern with perforated line $v$ midway between the third dart at the front of the garment and the 6 inch line extending from 40—$q$ to 26—$K'$, with point $u$ toward the top of pattern, the horizontal $z$ line on waist line. Dot in perforations along line $v$ and in perforations along horizontal line $z'$ and line $w$. Reverse the chart, placing vertical line $v$ on the chart exactly on the line of dots made on pattern for line $v$, with horizontal line $z$ on waist line and make another line of dots in perforated line $w$ and along horizontal line $z'$. Remove the chart and draw a line from the top of the pattern down dotted line $v$ to a point nine inches below the waist line. Draw a line along dotted line $w$ at right of $v$ and dotted line $w$ at left of $v$ from top of pattern down to the end of line $v$ $9\frac{1}{2}$ inches below waist line. The lines thus drawn from the top of the pattern to a point $9\frac{1}{2}$ inches below the waist line forming the side dart of the garment, the horizontal line of perforations $z'$ forming the waist line in this part of the garment.

The middle back of the corset is formed of two straight strips of cloth each two inches wide and as long as garment is desired. These two strips being straight and in all cases alike no pattern is cut for the same.

The last part of the pattern to be drawn is the side back. To outline this part of the pattern the back or left hand end of the chart is used, and the line $h$ which formed the bottom of the chart in outlining the pattern for the front half of the garment, becomes the top line of the chart in outlining the back of the garment. Place the chart upon the paper in the reversed position just described, and indicate the bust measure on line $i$, in this instance 40, and at bust size at line $j$, 40 also. Indicate the waist measure, 26, on line $r$, and place an indicating mark on the pattern opposite the figure 48 on line $q$, for a purpose hereafter referred to. Remove the chart from the paper and place a ruler on the number in line $i$ indicating bust measure, 40, and across 26 the number indicating waist measure in line $r$, and draw a line from 26 toward 40, the length of this line to be governed by back measure. Thus, if back measure is 14 inches or less, this line is drawn upwardly 6 inches from number 26 on line $r$ indicating waist measure. A line is drawn upwardly from the mark indicated at point opposite $q$—48 to number indicating bust measure on line $j$ in this instance 40, the length of this line to be governed by back measure, in this instance being 14 inches, these two lines will extend upwardly 6 inches. Draw a line connecting the upper ends of these two 6 inch lines to form the top of the pattern, and another line connecting the lower ends of these two 6 inch lines to form the waist line on the pattern.

To draw the hip line or side back, place the chart on the pattern with point $o$ on the chart at the lower end of 6 inch line extending from 40 to 26, having edge of chart along line $q$ exactly on this 6 inch line. Draw a line on pattern along chart from $o$ to $n$ and extend the line at this angle from 8 to 16 inches below the waist line, according to length desired for the garment.

Referring now to the hip measurement, in this instance 42 inches. From this deduct 4 inches, which is occupied by the two straight 2 inch strips heretofore referred to, and which is the same in all garments. This leaves 38 inches as the size of the pattern around the hips. In outlining a pattern for any garment, only one half of the garment is designed, therefore in this instance 18 inches is the required size of the pattern at the hip line. Measure the pattern outlined for the front of the garment at a point 8 inches below the waist line, which in this instance would be $10\frac{3}{4}$ inches, deduct $10\frac{3}{4}$ inches from 18 inches and $7\frac{1}{4}$ inches will be the measurement required for the side back at a point 8 inches below waist line to fit a 42 inch hip measurement. In the pattern for the back at a point 8 inches below the waist line on the last line drawn place a measure and indicate a point $7\frac{1}{4}$ inches to the left of this line and draw a line from left hand end of waist line through the last named mark, the length of this line to be determined by the length of the garment desired. A line drawn across to connect these two lines will indicate the bottom of the pattern at the back. The lines thus drawn upon the paper outline the entire pattern for the garment, after which any skilled operator may cut and finish a garment to exactly fit the measurements given.

It will thus be seen that I have produced a chart comprising but a single piece of material from which an entire garment may be delineated, the description heretofore given being followed for any different set of measurements by locating said measurements upon the chart in the manner outlined for the measurements here given.

I claim:

A chart for drafting patterns comprising a single elongated piece of material having the front edge thereof forming a straight vertical line extending downwardly to the lower edge, said lower edge forming an acute angle to the vertical front edge and representing the inclined waist line of the front portion of the pattern, the edge of the chart opposite the front vertical edge representing the under-arm seam line and consisting of two converging parts, the upper edge of the chart comprising converging parts representing the contour of the back portion of the pattern, substantially as described.

In testimony whereof I have hereunto set my hand in presence of two subscribing witnesses.

MARGARET M. FRANKLIN.

Witnesses:
 MARGARET A. HARROLD,
 EMILY BERLINER.

Copies of this patent may be obtained for five cents each, by addressing the "Commissioner of Patents, Washington, D. C."